United States Patent Office 3,432,555
Patented Mar. 11, 1969

3,432,555
PROCESS FOR PRODUCING AMINE OXIDES
Henry Mahnken, West New York, N.J., assignor to Millmaster Onyx Corporation, New York, N.Y., a corporation of New York
No Drawing. Filed Apr. 5, 1967, Ser. No. 628,546
U.S. Cl. 260—583                                 6 Claims
Int. Cl. C07c 85/00

ABSTRACT OF THE DISCLOSURE

This relates to the preparation of amine oxides by the reaction of tertiary aliphatic amines with hydrogen peroxide in aqueous composition, wherein the amine, water and a chelating agent are initially heated to a temperature above 80° C., at which time an approximately stoichiometric amount of the hydrogen peroxide is added to the mixture. There is then an exothermic reaction during which the temperature rises. When the amine contains aliphatic groups lower than $C_{18}$, the mixture remains fluid. But when it contains an aliphatic group of $C_{18}$ or above, gelling takes place at this time. When gelling does take place, the gel is, thereafter, spontaneously broken down and the mixture becomes fluid. As it cools, the product remains fluid until, at about 60° C., it again becomes increasingly viscous until, at about room temperature, it becomes a paste.

---

This invention relates to the preparation of amine oxides, and it particularly relates to the preparation of amine oxides of tertiary aliphatic amines by the reaction of the amines with hydrogen peroxide.

The tertiary amines utilized in the present invention are preferably those having two lower alkyls, preferably methyl or ethyl, and a higher alkyl of 8 to 22 carbon atoms, attached to the nitrogen atom.

Prior processes have been utilized wherein the amine was reacted with very dilute aqueous hydrogen peroxide solutions, the hydrogen peroxide solutions being dilute in order to avoid gelling of the reaction mixture into a thick paste long before the reaction is complete, which would make effective agitation and uniform control of the reaction temperature impossible. This type of process was commercially unsatisfactory because the rate of reaction was too slow and it was difficult to achieve anything approaching complete conversion of the amine to the amine oxide.

In order to utilize more concentrated peroxide solutions, such as the 20 to 90% solutions that are commercially available, it was proposed to gradually add the concentrated peroxide solution to the amine, under agitation at 40 to 80° C., continuing the agitation and maintaining the temperature of the mixture within this range until substantially complete conversion to the oxide was effected. However, this process was successful only when employing amines which had been freshly distilled since impurities present in the commercially available amines reduced the peroxide efficiency in the amine oxide reaction below tolerable levels.

It was then proposed to utilize the last-mentioned method, but to avoid the necessity of distillation of redistillation to purify the amine, by adding to the reaction mixture a small amount of diethylenetriaminepentaacetic acid (DTPA) or one of its water-soluble salts, such as its ammonium or alkali metal salt, this compound acting as a chelating agent which would prevent peroxide decomposition. In accordance with the latter practice, only DTPA could be used, other chelating agents not being considered to be satisfactory. Moreover, the temperature of the reaction still had to be retained at no higher than 80° C. and constant agitation was still necessary. This required constant cooling externally, and the addition, internally, of water to keep it sufficietly fluid to permit agitation. This resulted not only in the necessity of constant attention and additional treating apparatus, but also resulted in an overly lengthy treating period. In addition, it was found, in practice, that only those tertiary amines that had a relatively short higher alkyl chain, such as dodecyl dimethylamine, could be effectively utilized, since the longer chain amines would gel too rapidly at these temperatures. Nevertheless, it was believed that higher temperatures could not be used because of the apparent tendency of both the peroxide and the amine oxide to decompose at temperatures above 80° C. with attendant objectionable yellow color development.

In accordance with the present invention, a process is utilized wherein the reaction is conducted above 80° C., more specifically, betwee about 85–115° C. No cooling is required, the temperature being allowed to rise at will. Tertiary amines having an alkyl chain longer than dodecyl may be used, and chelating agents other than DTPA may also be effective. The chelating agent may be used in very small amounts, i.e. from about 0.01 to about 3% by weight relative to the amine. Furthermore, agitation may be used to expedite the reaction but is not effective at the exotherm if a gel forms.

The above is accomplished by first heating a mixture of the concentrated aqueous mixture of the tertiary amine and the chelating agent to a temperature higher than 80° C., and, thereafter, preferably at a temperature just below 90° C., adding the hydrogen peroxide. The temperature is then initially maintained at about 90° C. until it begins to rise spontaneously. As it rises, the mixture is converted to a gel and then at about 100° C., it spontaneously thins out and becomes a thin water-white fluid. As it cools, if there is no aliphatic group on the amine higher than $C_{16}$, the product remains fluid, but if there is an aliphatic group of $C_{18}$ or above, the product remains fluid until about 60° C., at which point it becomes increasingly viscous until about room temperature, at which temperature it becomes a paste.

The following examples are illustrative of the present invention, but are not intended to limit said invention except as claimed:

EXAMPLE 1

| Components: | Amounts in lbs. |
|---|---|
| Stearyl dimethylamine (at equivalent weight 311 by titration, 4.66 mols) | 1,448 |
| Filtered water | 3,300 |
| Hydrogen peroxide (35% aq. sol.) (at 34.4% titrated, 0.518 mols) | 510 |
| Trisodium salt of ethylene diamine tetraacetic acid (EDTA) | 1.5 |

The amine, water and chelating agent were charged into a 2,000 gallon closed kettle fitted with an agitator and a jacket for heating and cooling. During the charging, steam was applied and, at 88° C., the hydrogen peroxide was added during the course of about three-quarters of an hour. It was necessary to apply more heat during the next half-hour to maintain a temperature of about 90° C. At the end of this half-hour interval, the surface of the charge appeared to be blue at the periphery and the temperature rose spontaneously to about 104.5° C.

Gradually the mass turned viscous and grayish until, twenty minutes later, it became a gel that was no longer stirrable, and with some ebullition. This gel phase lasted about one hour, after which the gel dissolved and, finally, after a further one-half hour, became completely fluid with only a little foam which soon broke. One and one-half hours after the exothermic reaction began, a sample was removed at 102° C., cooled and titrated. It assayed 27.5% by weight as amine oxide and 1.26% by weight as free amine. It was, therefore, about 95.6% reacted. There was 0.40% hydrogen peroxide remaining.

After an additional two hours, during which the temperature fell to 94° C., a sample assayed 28.32% by weight amine oxide and 0.61% by weight free amine. It was, therefore, 98% reacted.

On dilution, a final sample assayed as follows:

| Components: | Percent by wt. |
|---|---|
| Amine oxide | 24.14 |
| Free amine | 0.26 |
| Free $H_2O_2$ | 0.017 |
| Percent completion | 99 |

The product was water-white and remained fluid until it reached 60° C. at which point it became increasingly viscous until, at about room temperature, it set to a white paste.

Analysis of the product by bromine number indicated only a fraction of a percent of olefin, corresponding to the olefin content of the amine itself.

EXAMPLE 2

The identical components and process were used as in Example 1 except that the sodium salt of diethylenetriaminepentaacetic acid (DTPA) was substituted for the EDTA as the chelating agent. The results were identical.

EXAMPLE 3

The identical components and process were used as in Example 1 except for the substitution of dodecyl dimethylamine for its stearyl homolog. The results were almost identical to those in Example 1 except that at the end of the one and one-half hour period, the reaction was more than 98% complete, and there was no gelation even at ambient temperature.

EXAMPLE 4

The identical components and process were used as in Example 1 except that tetradecyl dimethylamine was subsubstituted for its stearyl homolog. The results were similar to those in Example 3, but the product was a semi-paste at ambient temperature.

It is to be understood that although the hydrogen peroxide is preferably used in at least stoichiometric amounts, but generally not above 10% by weight excess, other concentrations of the hydrogen peroxide may be used by adjusting the amounts of water in the charge.

The invention claimed is:

1. A method of producing amine oxides by the reaction of (1) a tertiary amine having two lower alkyls and a higher alkyl attached to the nitrogen atom and (2) aqueous hydrogen peroxide, which comprises mixing said tertiary amine with water and a chelating agent, heating the mixture to a temperature between about 85°–115° C. then adding at least a stoichiometric amount of the aqueous hydrogen peroxide, thereafter, permitting the temperature to rise exothermically, and then cooling the mixture.

2. The method of claim 1 wherein, if the mixture becomes gelatinous as the temperature rises, the exothermic reaction is permitted to continue until the mixture again becomes fluid.

3. The method of claim 1 wherein the aqueous hydrogen peroxide is added gradually.

4. The method of claim 1 wherein the mixture is cooled to about room temperature.

5. The method of claim 1 wherein the chelating agent is used in an amount of from about 0.01 to about 3% by weight relative to the amine.

6. The method of claim 1 wherein the reaction of the entire mixture is conducted at a temperature of about 85–115° C.

References Cited

UNITED STATES PATENTS 3,047,579   7/1962   Witman.
3,283,007   11/1966   Chadwick.

CHARLES B. PARKER, *Primary Examiner.*

R. L. RAYMOND, *Assistant Examiner.*